No. 754,976. PATENTED MAR. 22, 1904.
C. G. DOLBIER.
TOWEL OR OTHER RACK.
APPLICATION FILED MAR. 17, 1903.
NO MODEL.
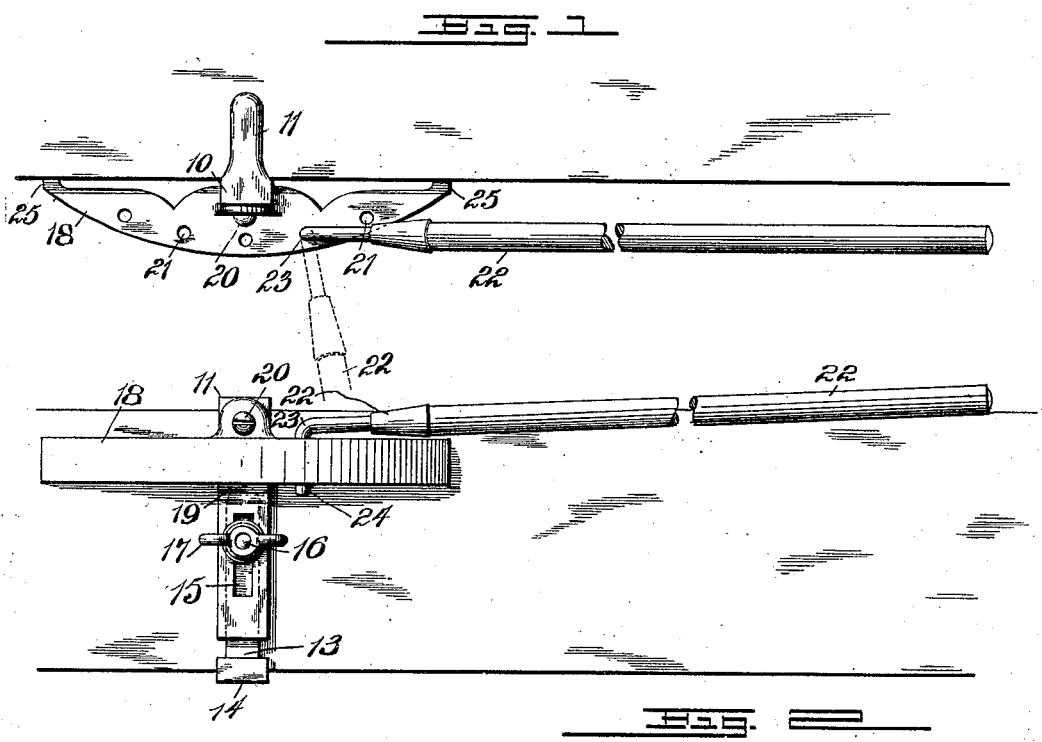
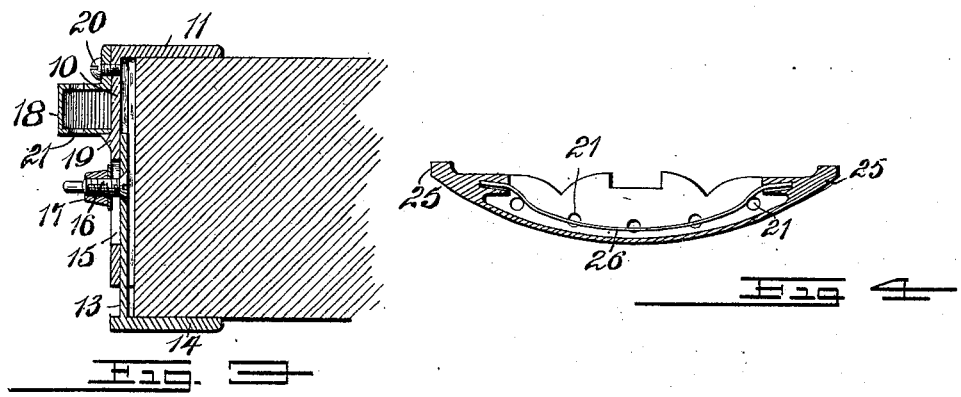
WITNESSES:
J. G. Dunbar
John Carolan
INVENTOR
Charles G. Dolbier
BY
Wm. H. Caufield. ATTORNEY.

No. 754,976.                                          Patented March 22, 1904.

UNITED STATES PATENT OFFICE.

CHARLES G. DOLBIER, OF NEWARK, NEW JERSEY.

TOWEL OR OTHER RACK.

SPECIFICATION forming part of Letters Patent No. 754,976, dated March 22, 1904.

Application filed March 17, 1903. Serial No. 148,259. (No model.)

*To all whom it may concern:*

Be it known that I, CHARLES G. DOLBIER, of Newark, Essex county, New Jersey, have invented certain new and useful Improvements in Towel or other Racks, of which the following is a full, clear, and exact description.

This invention refers to an article adapted to be clamped to projections of different thicknesses and preferably to the stone shelves arranged over ranges or stoves, and is also adapted to hold a series of rotatably-arranged rods on which clothing, &c., can be hung to be dried.

Another object of my invention is to provide an article of the class described which can allow the rods to be swung until approximately parallel with the supporting means when the rods are not in use, so that the room is economized and the device at such times is not in the way.

The invention is illustrated in the accompanying drawings, in which—

Figure 1 is a top view, and Fig. 2 is a front view, of the device. Fig. 3 is a section on line 3 3 in Fig. 2, and Fig. 4 is a section of the rod-supporting frame with a modification incorporated.

In the drawings a shank 10 is arranged to partly embrace a projection, preferably a stone mantel, and a lip 11 lies on the top thereof, and a shank 13 has a lip 14, adapted to catch the side of the supporting projection opposed to the lip 11. A slot 15 in the shank 10 allows a stud or screw 16 on the shank 13 a certain amount of travel, and a thumb-screw 17 or other means fastens the lips or jaws at any point, so that the frame is adjustable to different thicknesses of stone or block. A saddle 18 is arranged on a projection 19 and fastened by a screw 20, being adapted to hold, by means of the perforations 21, a series of rods 22. These rods have a turn in the end thereof, as at 23, so that a short end 24 projects down through both walls of the saddle 18, and this end 24 being bent at an obtuse angle to the rod 22 raises it up so that the rods 22 can be swung around, as shown in Fig. 2, and clear the top edge of the saddle 18, so that they can be laid up close to the shelf, and when the rods are so arranged each rod will ride over the next adjacent toward the end of the saddle. The saddle 18 has the ends 25 arranged in the same plane as the inner face of the shank 10, so that these ends bear on the face of the supporting means and act as a steadying means for the whole structure.

As shown in Fig. 4, I may insert a leaf-spring 26 in the saddle 18, and then the rods are held against accidental rotation by the pressure of the spring, this pressure being induced by the displacement occasioned by the insertion of the part 24.

It will be evident that I have devised a rack that is simple and at the same time compact and symmetrical and that will be cheap to manufacture.

Having thus described my invention, what I claim as new, and desire to secure by Letters Patent, is—

1. A rack comprising a clamp, a horizontally-disposed saddle provided with a series of perforations, a set of rods removably arranged in said perforations, and a spring bearing against said rods to steady them.

2. A rack, comprising a clamp, a hollow saddle secured to said clamp having a series of perforations arranged in its upper and lower walls, said saddle having its ends arranged in line with the inner edge of the clamp, and a series of rods arranged in said perforations.

3. A rack, comprising a clamp, a horizontally-disposed curved saddle having perforations passing through it, adapted to be secured at its center to the clamp, and having its ends in line with the inner edge of the clamp, in combination with a set of rods arranged in said perforations, each rod having its engaging end bent at an obtuse angle to the rod.

In testimony whereof I have signed my name to this specification in the presence of two subscribing witnesses.

CHARLES G. DOLBIER.

Witnesses:
 WM. H. CAMFIELD,
 J. G. DUNBAR.